(No Model.)  2 Sheets—Sheet 1.
J. LEDERLE.
MALT TURNING APPARATUS.
No. 247,504. Patented Sept. 27, 1881.
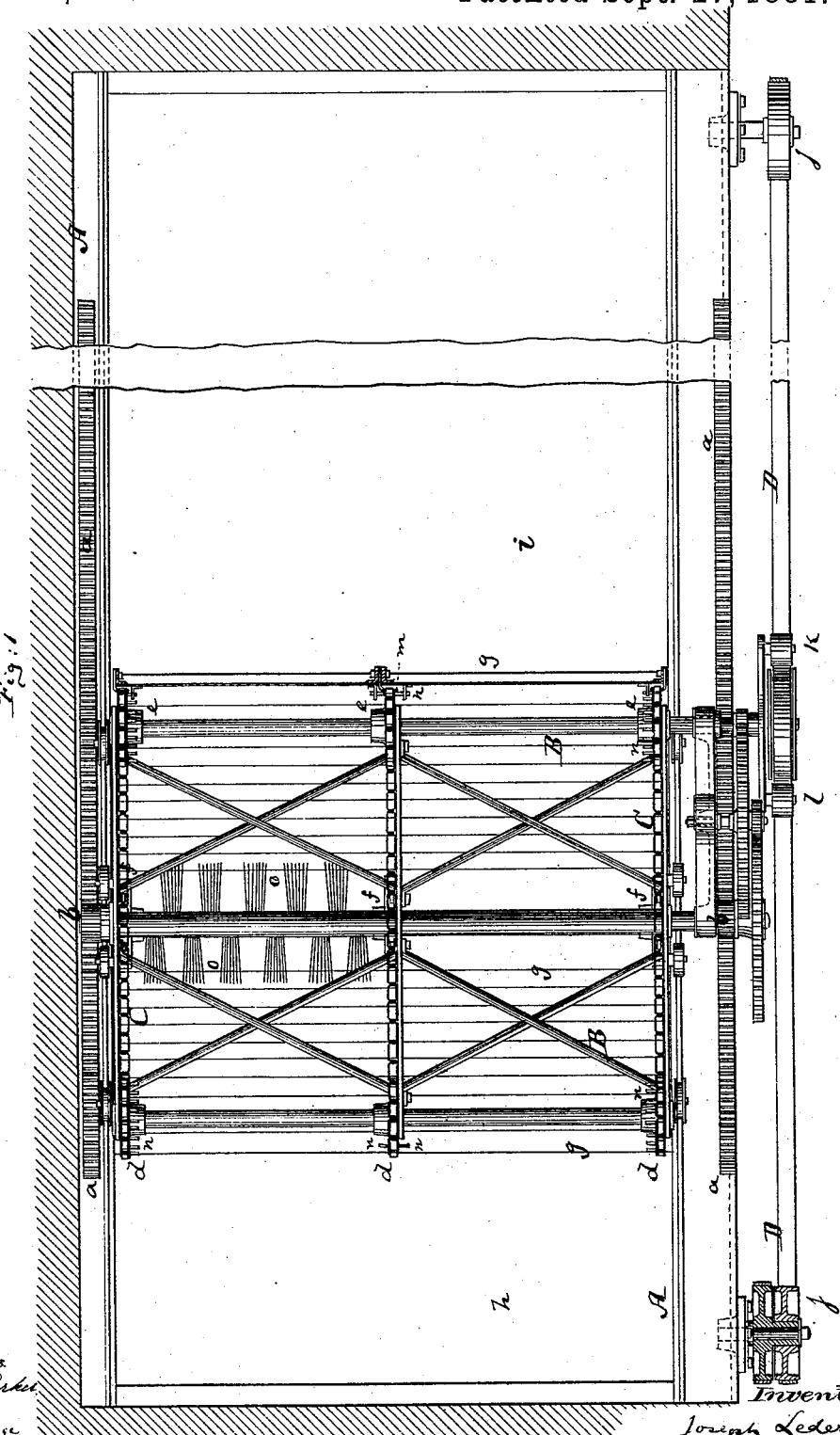

(No Model.) 2 Sheets—Sheet 2.
J. LEDERLE.
MALT TURNING APPARATUS.
No. 247,504. Patented Sept. 27, 1881.
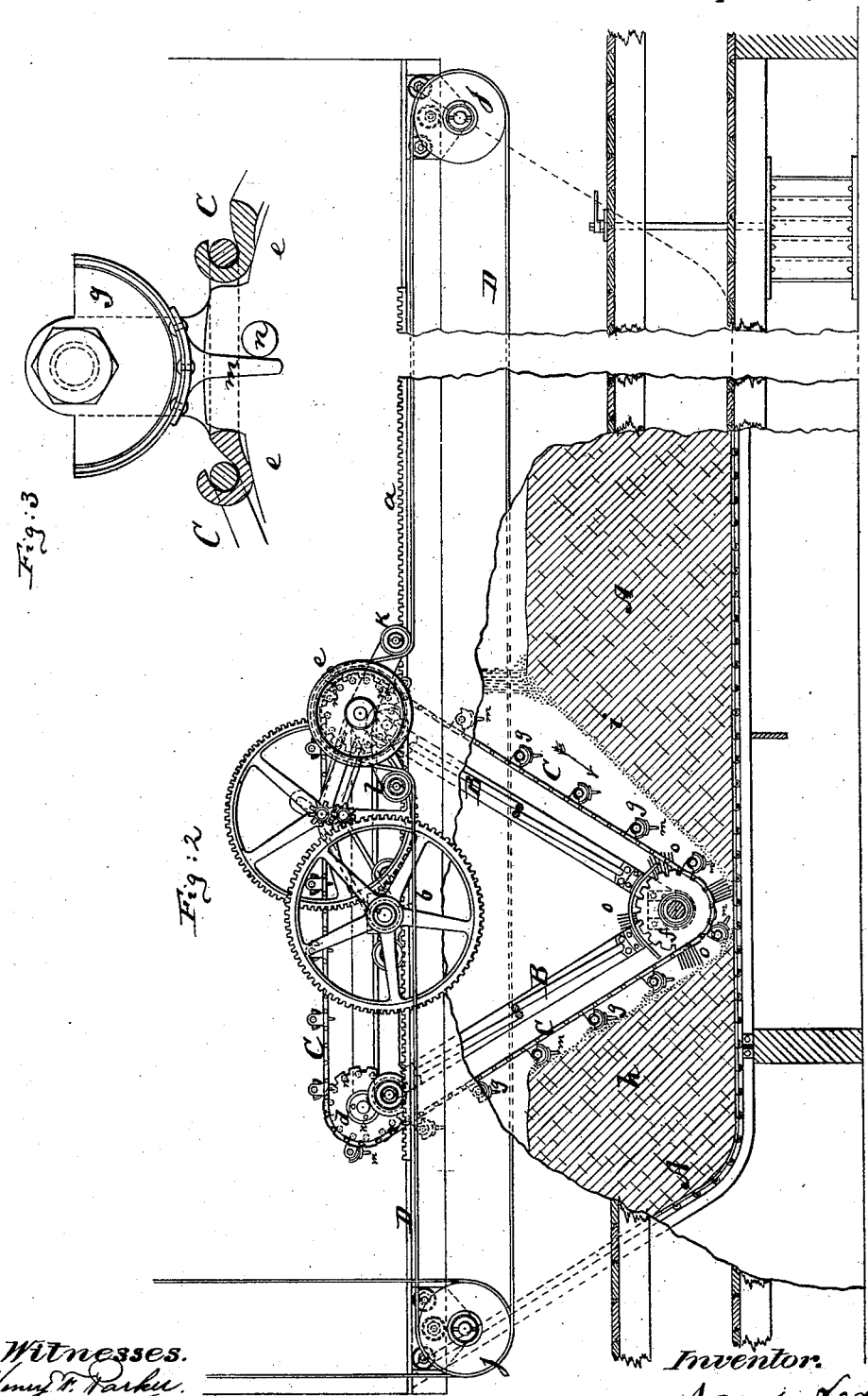

UNITED STATES PATENT OFFICE.

JOSEPH LEDERLE, OF EDGEWATER, NEW YORK.

MALT-TURNING APPARATUS.

SPECIFICATION forming part of Letters Patent No. 247,504, dated September 27, 1881.

Application filed January 3, 1881. (No model.)

*To all whom it may concern:*

Be it known that I, JOSEPH LEDERLE, of Edgewater, in the county of Richmond and State of New York, have invented a new and Improved Malt-Turning Apparatus, of which the following is a specification.

Figure 1 is a top view of my improved malt-turning apparatus; Fig. 2, a side view, partly in section, of the same; and Fig. 3, a detail enlarged sectional view, showing a suspended bucket.

The object of this invention is to produce an apparatus for turning the malt in the germinating-vats of malt-houses, and preventing it thereby from becoming felted together, which it is liable to do, owing to the formation of the rootlets, unless properly disturbed from time to time. For this purpose stirring apparatus has heretofore been proposed; but the difficulty with all stirring apparatus known to me is that it is liable to break the grains or rootlets, thereby destroying them for malting purposes, and also because not positive as to the certainty of reaching every particle of the mass contained within the germinating-vat.

My invention consists, principally, in the arrangement of a traveling chain which carries buckets and dips into the vat so as to carry the contents of the vat from one end to the other while progressing along the length from end to end, all as hereinafter more fully described.

The invention also consists in various details of mechanism, all of which I will now specify.

In the drawings, the letter A represents a germinating-vat. The sides of this vat carry fixed rack-bars *a*, upon which travel the toothed supporting-wheels *b* of the dipping-carriage B. This dipping-carriage has inclined sides that converge at their lower ends and enter the vat, as clearly shown in Fig. 2. The carriage is practically a triangular frame-work carrying a chain-wheel in each angle, said chain-wheels being marked *d e f* in the drawings. Over these chain-wheels is passed a chain, C, which carries a series of buckets, *g g*, said buckets being hung in lugs that project from the chain. The buckets are suspended in such a manner that they will hang vertically, or mouth upward, whenever they are in a normal position.

The converging sides of the frame B are placed at an angle which is about parallel with the natural slope of malt when in a heap. Thus in Fig. 2, the sectional portions (marked *h* and *i*) represent heaps of malt contained within the vat A; and it will be observed that my dipping frame enters between these two angles, and is intended (the wheels *b* traveling along on the rack-bars *a* in a longitudinal direction) to have the buckets take malt from one heap in the vat and transfer it the other heap, thereby insuring a complete distribution and separation from each other of all the grains contained in the vat. The carriage B receives its motion longitudinally from a belt, D, which passes over suitable pulleys, *j j*, from one of which it derives its power, said belt D passing also over a pulley on the axis of the chain-wheel *e*, as shown in Fig. 2, and thence beneath two little friction-rollers, *l l*, that have their supports in the carriage B, so that thus by means of the belt D the carriage will be moved lengthwise and the chain C will at the same time be revolved. When the carriage arrives at one end of the vat a suitable automatic or other shipping mechanism will shift the belt D, so as to reverse its motion and cause the carriage to run to the other end of the vat, and so on *ad infinitum* until the stirring has been perfected. Assuming, now, that the chain is revolved in the direction of the arrow shown in Fig. 2, it will be readily seen that the buckets, as they arrive under the lowermost wheel, *f*, are tilted by contact of their downwardly-projecting spurs *m* with the mass of grain in the pile *i*, and being thus tilted, the buckets will, as they reach the pile *h* in ascending, be in proper inclined position which will enable them to become filled with grain from the pile *h*, the lowermost bucket in Fig. 2 showing the position intended. Thus the buckets will, while the carriage advances from the pile *i* toward the pile *h*, take away from the pile *h* grain in said buckets and carry it over to the other pile, *i*, where it redeposits this grain.

In order to tilt the buckets above the heap of grain *i*, the projecting spur *m* of each bucket, as it approaches the chain-wheel *e*, strikes one of a series of horizontally-projecting pins, *n*, that extend from the wheel *e*, as clearly indicated by dotted lines in Fig. 2 and fully shown in Fig. 3, and, retaining contact with that pin $n$, the spur $m$ is prevented from assuming the vertical position which it normally would assume, and the bucket is thus gradually tilted until, when it is horizontally in line with the axis of the wheel $e$, it discharges its contents upon the heap of grain $i$. Now, when the direction of movement of the carriage B is reversed, so that instead of moving from the heap $i$ toward the heap $h$, it will move toward the heap $i$, the rotation of the chain is also reversed, and the buckets will take from the heap $i$ and deposit grain upon the heap $h$, the chain-wheel $d$ having projecting-pins $n$, that are similar to and operate on the same principle as those shown on the chain-wheel $e$.

In order to prevent the buckets that are approaching the bottom of the vat from crushing the grain against the metallic or other bottom of the vat, and thereby spoiling so much of the contents of the vat, I propose to form a brush, $o$, on the axis of the lower wheel, $f$, as indicated in Fig. 2, said brush serving to sweep the bottom of the vat, where the heaps $h$ and $i$ converge, clean, and prevent any grain from being in the way of the lowermost bucket on the bottom of the vat and from consequently being crushed. After the germinating process has been completed my above-mentioned improved apparatus can also be used with great advantage in discharging the contents of the vat from the same upon a suitable transverse apron, which, in that case, is placed beneath the discharging-buckets, but above the vat transversely, and caused to carry the grain it receives to another apron or table, whence it goes to the kiln or to other suitable receptacles.

I claim—

1. In combination with the vat of a malt-house, the traveling carriage B, provided with chain C and buckets $g$, and arranged to delve into the vat and to take the contents thereof from one side and deposit them on the other side, substantially as described.

2. The combination of the vat A, having rack-bars $a$, with the operating-belt D, carriage B, chain C, chain-wheels $d$, $e$, and $f$, and buckets $g$, all arranged to operate substantially as herein shown and described.

3. The converging malt-distributing chain C, having the buckets $g$, in combination with the brush $o$ and vat A, substantially as and for the purpose specified.

4. The chain C and its bucket $g$, and spurs $m$ on the frame B, in combination with the chain-wheel $e$ and the pins $n$ thereon, substantially as and for the purpose herein shown and described.

JOSEPH LEDERLE.

Witnesses:
   A. V. BRIESEN,
   SAML. R. BETTS.